Oct. 23, 1962
J. O. TROEMNER ETAL
3,059,742
PLURAL CLUTCH CONTROL
Filed June 20, 1960
2 Sheets-Sheet 1
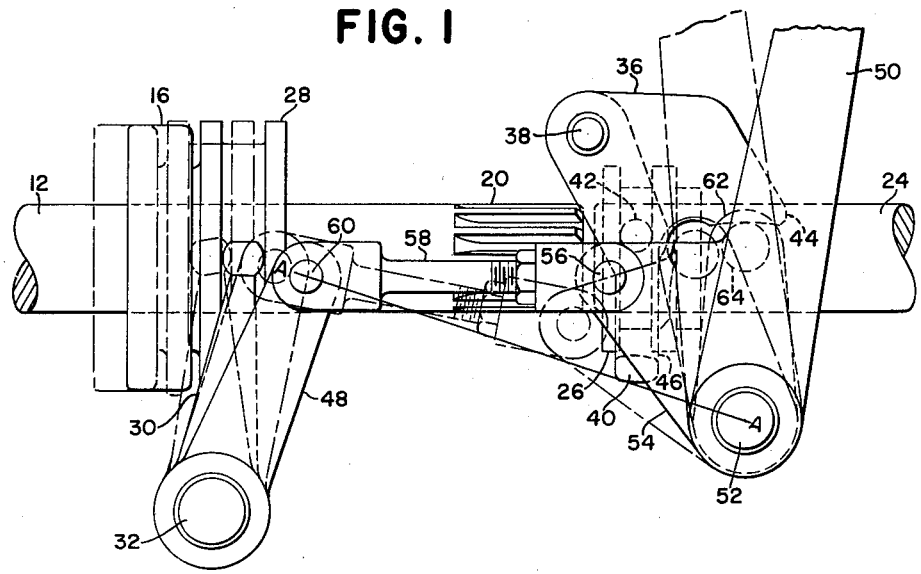
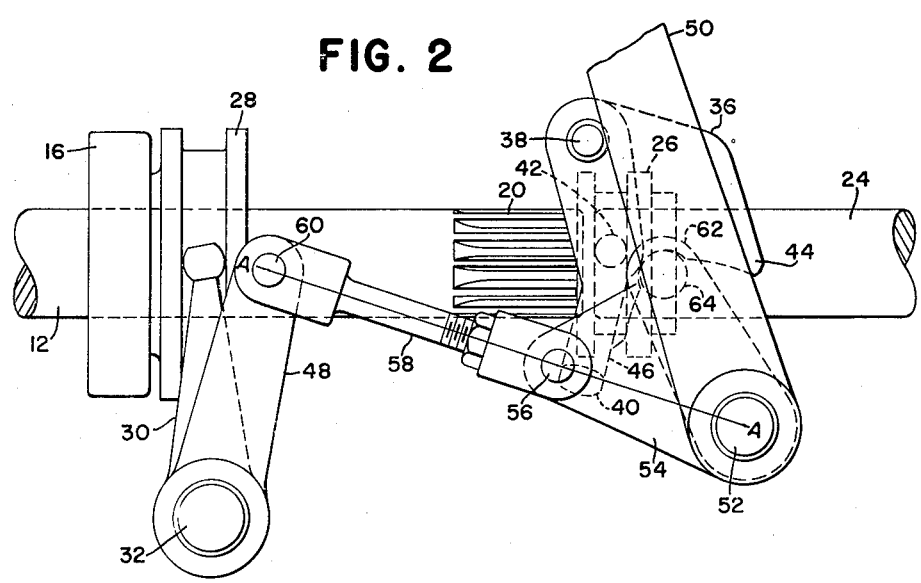
INVENTORS
J. O. TROEMNER
D. H. PEARSON Oct. 23, 1962 J. O. TROEMNER ETAL 3,059,742
PLURAL CLUTCH CONTROL
Filed June 20, 1960 2 Sheets-Sheet 2

INVENTORS
J. O. TROEMNER
D. H. PEARSON 3,059,742
PLURAL CLUTCH CONTROL
James O. Troemner and Dwight H. Pearson, Cedar Falls, Iowa, assignors to Deere & Company, Moline, Ill., a corporation of Delaware
Filed June 20, 1960, Ser. No. 37,156
6 Claims. (Cl. 192—48)

This invention relates to control mechanism and more particularly to such mechanism for coordinating the control of a pair of shiftable members, such as clutches arranged in series in a power transmission.

A typical example of the power transmission to which the control mechanism is especially applied is that utilized in agricultural and industrial tractors wherein a driving shaft is connected by a first clutch to an intermediate shaft which in turn is connected by a second clutch to an output or PTO shaft. In an instance of this character, the first clutch is normally a friction clutch and the second clutch is a positive or jaw clutch. When the PTO is to be idle for any appreciable length of time, the jaw clutch will be disconnected, and the friction clutch is provided in the line to facilitate disconnection and reconnection of the jaw clutch. Without the friction clutch, it would be difficult to effect connection and reconnection of the jaw clutch. Without the jaw clutch, some means would have to be provided for keeping the friction clutch in a disengaged condition when the PTO shaft is idle. For several well known reasons, it is undesirable to maintain the friction clutch in a disengaged condition, apart from the fact that such special control means would materially increase the cost of the transmission.

According to the present invention, control mechanism is provided for coordinating the selective engagement and disengagement of the two clutches so that in one condition the friction clutch may be engaged and disengaged while the jaw clutch is disengaged and in the other condition the friction clutch may be engaged and disengaged while the jaw clutch is engaged. Stated otherwise, it is a feature of the control mechanism to afford sequential operation of the two clutches. It is a further feature of the invention to utilize in the control mechanism an over-center linkage system having two over-center conditions respectively at opposite sides of an on-center or dead-center condition, the latter being used to achieve disengagement of the friction clutch while either over-center condition achieves the engaged condition of the friction clutch; at the same time, a lost-motion mechanism is provided between the linkage and the jaw clutch so that so long as the linkage does not pass over its dead-center condition no change will be effected in the position or status of the jaw clutch. In other words, the over-center linkage is movable through two ranges, in either of which the jaw clutch retains a previous status but when a change is effected from one range to the other, irrespective of direction, the status of the jaw clutch is changed.

The foregoing and other important objects and desirable features inherent in and encompassed by the invention will become apparent as a preferred embodiment thereof is disclosed in detail in the ensuing description and accompanying sheets of drawings, the figures of which are described below.

FIG. 1 is a fragmentary elevation showing, in full lines, a drive condition in which the friction clutch is engaged and the positive clutch is disengaged, the broken line position representing a pre-dead-center condition in which the friction clutch is disengaged while the positive clutch is still disengaged.

FIG. 2 is a similar view but shows the dead-center condition in which the friction clutch is still disengaged and engagement of the positive clutch is beginning.

Figure 3:
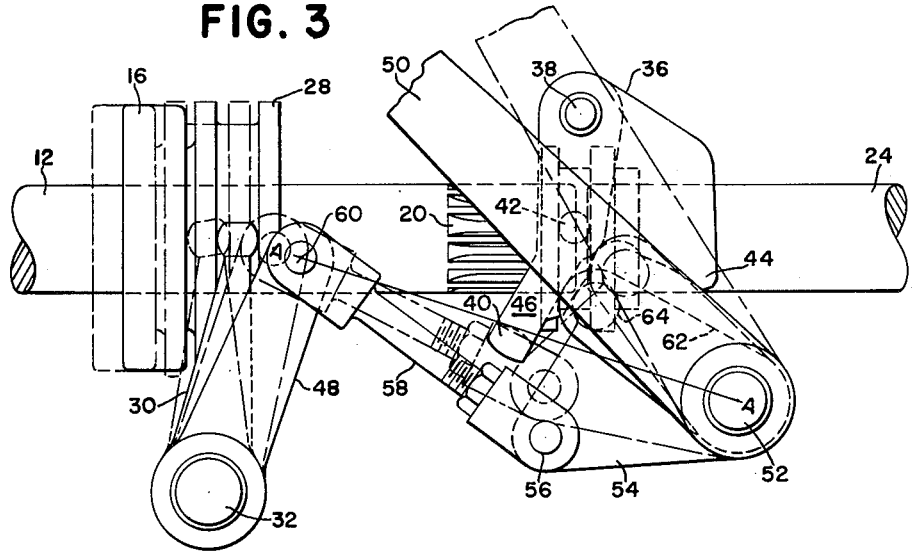

FIG. 3 represents a further condition in the operation, the full-line showing illustrating an over-center condition just the opposite of that shown in full lines in FIG. 1 and representing that status of the drive in which both clutches are engaged, the broken-line position illustrating an intermediate position on the return of the linkage to its dead-center condition to effect disengagement of the friction clutch prior to disengagement of the positive clutch.

Figure 4:
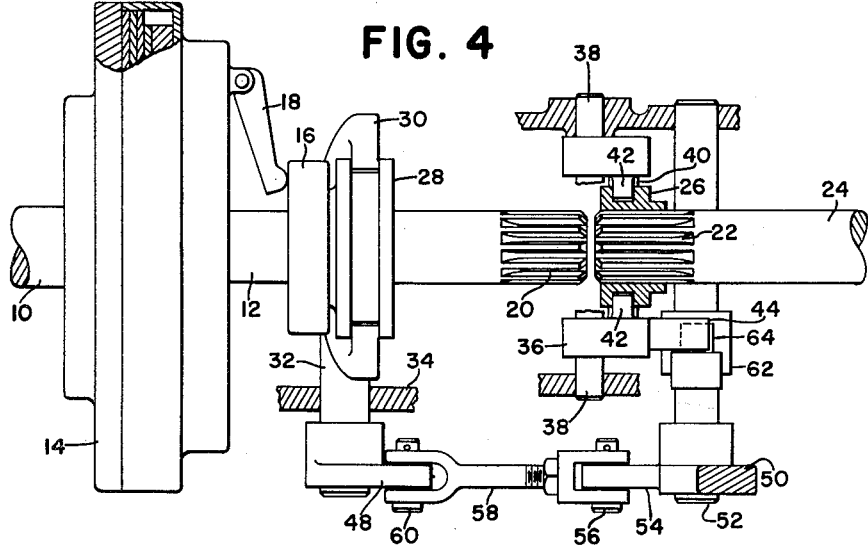

FIG. 4 is a plan view, partly in section and drawn to a reduced scale, illustrating the control mechanism in association with typical friction and positive clutches.

Figure 5:
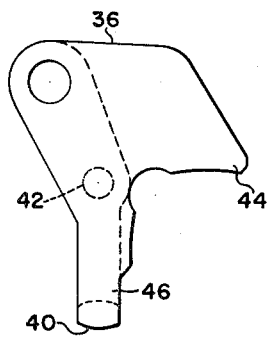

FIG. 5 is a detail view of the clutch-operating member for the positive clutch.

Reference will first be had to FIG. 4, wherein the numeral 10 represents a driving shaft which may be connected to an internal combustion engine or the like as is typical in vehicles of the type with which the invention is particularly concerned. This shaft is selectively connectible to and disconnectible from an intermediate shaft 12 through the medium of a first friction clutch 14. This clutch may be of any typical construction and therefore is not shown in detail. Suffice it to note that it is spring-loaded to an engaged condition and is disengaged by means of a throw-out collar 16, concentrically mounted on the shaft 12, and typically acting in concert with throw-out fingers on the clutch, one of which is represented by the numeral 18.

The shaft 12 has its rear terminal end splined at 20 to correspond with the splined forward end 22 of an output or PTO shaft 24. The splines match and form parts of a second clutch of the positive type, here represented by a concentric internally splined collar 26. This collar is shown in its disengaged position in FIGS. 1 and 4; in its pre-engaged condition in FIG. 2; and in its engaged condition in FIG. 3. As will be best understood from FIGS. 1 and 4, the collar 26 may be disengaged (as shown) so that the friction clutch 14 may be engaged between the shafts 10 and 12 while the PTO shaft 24 remains idle.

As will be appreciated, it would be difficult, without the friction clutch 14, to engage and disengage the positive clutch collar 26 across the splines 20 and 22. It will also be appreciated that this problem could be eliminated by substituting a friction clutch for the positive clutch 26 and omitting the friction clutch at 14, which would of course facilitate connection and disconnection between the shafts 12 and 24 but which would involve the problem of providing some means for keeping the friction clutch in a disengaged condition when it is desired to keep the PTO shaft idle. Accordingly, the use of two clutches has been adopted and this arrangement, together with an improved control arrangement of the character disclosed and about to be described, furnishes an ideal power transmission and control mechanism therefor.

The throw-out collar 16 is of course rotatably mounted relative to the shaft 12 and has associated therewith a coaxial throw-out collar 28 which is annularly grooved as shown to receive the trunnions of a throw-out yoke 30, which yoke represents a first clutch arm or element fixed to a rockshaft 32 which in turn is rockable in a suitable support, such as represented at 34, which may be part of a typical transmission casing. Additional portions of the support, illustrated but not further identified, may, as will presently appear, mount additional portions of the control mechanism. Whether these portions are entirely within the transmission casing or in part exteriorly thereof is not material to the present invention.

A second clutch member or arm in the form of a bell crank 36 is rockably carried by the support 34 by means of a pair of coaxial trunnions 38, the member 36 preferably having opposite legs joined by an integral cross portion 40 which establishes a yoke for controlling the collar 26 which, as will be seen, has an annular groove in which diametrically opposed pins 42 on the member 36 are received.

The member 36, regarded as a bell crank, has first and second arms 44 and 46, and these are spaced angularly as respects the rocking axis of the rockshaft 38. The purpose of the spacing therebetween is to afford part of lost-motion means to be presently described. The arm 36 is capable of assuming two positions, one of which is shown in FIG. 1 as the clutch-disengaged position and the other of which is shown in FIG. 3 as the clutch-engaged position. Movement of the arm 36 is coordinated with an arm 48 which is fixed to the rockshaft 32 for controlling the first clutch 14, and this arm 48 likewise has two positions, one of which is the clutch-engaged position as shown in FIG. 1 in full lines, as well as in FIG. 3 in full lines, and the other of which is its clutch-disengaged position as shown in full lines in FIG. 2 and in broken lines in FIGS. 1 and 3.

The means for coordinating the movement of the two arms 36 and 48 includes, among other things, a control arm or member 50 which is fixed to a rockshaft 52 journaled in the support 34 in parallel relation to the rockshafts 32 and 38. This arm has integrally formed therewith, or otherwise as a matter of choice, a forwardly projecting attaching arm portion 54 which has a pivotal connection at 56 with the rear end of a fore-and-aft extending link 58, the forward end of which has a pivotal connection at 60 with the terminal end of the first clutch arm 48.

The two arms 48 and 54 and the link 58 establish an over-center linkage means which has an on-center or dead-center condition as represented by the line A—A and which further has two over-center conditions, one at either side of the dead-center condition A—A. One of the over-center positions is shown in FIG. 1 and the other in FIG. 3, both in full lines. The dead-center position is shown in FIG. 2. The linkage is so arranged that when the linkage is in its dead-center position (FIG. 2) the operating means for the clutch 14 is in its clutch-disengaged position, meaning that the friction clutch 14 is disengaged between the shafts 10 and 12. The clutch 14 will be engaged in either over-center condition of the linkage. Therefore, as the control arm 50 is rocked forwardly it may be regarded as traveling through first and second consecutive ranges, in the first range moving the linkage from one over-center condition to its dead-center condition and in the second range moving the linkage from the dead-center condition to the over-center condition. Reverse movement of the control arm 50 will repeat the position changes in the mechanism for the clutch 14. Hence, a forward movement of the control arm 50 through its two consecutive ranges will change the clutch 14 from engaged to disengaged and back to engaged conditions and rearward movement of the arm 50 will repeat those conditions.

The connection between the linkage and the arm 36 for the clutch collar 26 is effected by means which may be regarded as an integral part of the control arm 50, since it includes an arm 62 rigid on the rockshaft 52. This arm has rigid therewith at its terminal end a stud or follower 64 which cooperates with the arms 44 and 46 on the member 36. The follower or stud 64 is so proportioned relative to the spacing of the arms 44 and 46 that lost-motion force-transmitting means is established, and this means is effective in opposite directions to change the status of the clutch 26 in a predetermined manner according to changes in the status of the friction clutch 14. This will be best understood by looking first to FIG. 1 which shows that, with the arm 50 in its rearwardmost position, and the linkage in its upper over-center position, the arm 44 on the member 36 lies above the stud 64 and the arm 46 is in forwardly spaced relation to the stud 64. Consequently, the control arm 50 may be moved to its broken-line position without changing the status of the collar 26, since the lost motion permitted enables this movement of the arm 50. At the same time, the over-center linkage is moved to a condition in which it approximates its over-center position, thus beginning disengagement of the clutch 14, the shifted position of the throw-out collar 16 being shown in broken lines.

FIG. 2 shows further movement of the control arm 50 to a position in which the over-center linkage is in its dead-center condition A—A, thus fully disengaging the friction clutch 14 and at the same time the stud 64 picks up the member 36 via the forward or lower arm 46, thereby rocking this member in a clockwise direction about the axis of the rockshaft 38 so as to begin shifting the collar 26 forwardly and into engagement with the splined rear end 20 of the intermediate shaft 12. It will be understood, of course, that the collar 26 retains its splined connection with the forward end 22 of the PTO shaft 24 and what is involved is that the collar bridges the two splined portions 20 and 22 to effect connection of the shafts 12 and 24. Up to this point, the arm 50 has moved forwardly in what has been described as its first range; that is, a range in which the over-center linkage changes from an over-center condition to a dead-center condition. To complete engagement of the clutch 26, forward movement of the control arm 50 is continued; that is to say, the arm travels now in its second range, in which the over-center linkage changes from its dead-center condition of FIG. 2 to the lower over-center condition represented by full lines in FIG. 3. This completes engagement of the clutch 26 and simultaneously incurs re-engagement of the friction clutch 14. This will be clear from the previous statement that movement of the control arm 50 in one direction through both ranges first disengages and then re-engages the friction clutch, and the relationship of the linkage to the member 36 for the clutch collar 26 is such that dual-range movement of the control arm 50 in one direction effects a single change in the status of the collar 26. In the instance just described, the change in status will be from disengaged condition to engaged condition.

Conversely, return movement of the control arm 50 through the angular extent required by travel through the two consecutive ranges will change the status of the clutch 14 twice while changing the status of the clutch collar 26 once. Specifically, as the control arm 50 returns from the position of FIG. 3 to that of FIG. 1, it moves first to the broken-line condition of FIG. 3, first disengaging the clutch 14 as the linkage approaches its dead-center condition. Lost motion between the follower 64 and the rearward or upper arm 44 on the member 36 will occur during the change between the full-line condition and the broken-line condition of FIG. 3. That is to say, the control arm may be moved back and forth in its second range to change the status of the clutch 14 without affecting the status of the collar 26, because it is not until the over-center linkage approaches and then passes through its dead-center condition that the follower 64 positively engages the arm 44 to rock the member 36 in a counterclockwise direction for returning the clutch collar 36 to the disengaged condition of FIG. 1.

The nature of the arms 44 and 46 will best be seen in FIG. 5, wherein it is shown that the underside of the arm 44 is an arc about the axis of the rockshaft 52 when the member 36 is in the position of FIG. 1, and the rear side of the arm 46 is an arc about the axis of the rockshaft 52 when the member 36 is in the position of FIG. 3.

The member 36 may be associated with detent means if desired for retaining the two positions thereof. However, since the clutch 14 is spring loaded and the force of the spring loading will be transferred to the over-center linkage system in both conditions thereof, and this in turn will retain the respective positions of the control arm 50, the likelihood that the member 36 will shift out of one or the other of its positions is very slight, since, when the over-center linkage is in either over-center condition, the associated arm 44 or 46 positively engages the follower 64 so that retrograde movement of the member 36 is prevented.

It will thus be seen that a simple control mechanism has been provided for coordinating the changes in status of the two clutches 14 and 26 and that a single change in the status of the clutch 26 involves a dual change in the status of the clutch 14. This enables sequential control of the clutches so that for either engagement or disengagement of the positive clutch 26 the friction clutch is first disengaged and then re-engaged. This is all accomplished by a single movement of the control arm 50, forwardly to engage the clutch 26 and rearwardly to disengage that clutch. Another feature is that when the clutch 26 is engaged for typical PTO operation, the friction clutch 14 may be selectively engaged and disengaged without affecting the status of the clutch 26, thereby enabling the clutch 14 to be used for temporary cessation of drive to the PTO shaft. As already described, disconnection of the PTO shaft for prolonged periods may be accomplished by disconnecting the shafts 12 and 24 via the positive clutch 26, which operation is facilitated by the control mechanism and its effect on the friction clutch 14. This further eliminates the need for mechanism to keep the friction clutch disengaged, which, in normal conditions, is undesirable.

Features and advantages other than those categorically enumerated herein will readily occur to those versed in the art, as will many modifications and alterations in the preferred embodiment disclosed, all of which may be achieved without departure from the spirit and scope of the invention.

What is claimed is:

1. Control mechanism for a power transmission including first and second selectively engageable and disengageable clutches, comprising: a support; over-center linkage means on the support and having first and second over-center conditions respectively at opposite sides of a dead-center condition; a first clutch member connected to the first clutch and movable between clutch-engaged and clutch-disengaged positions; first means connecting said member to the linkage for incurring the clutch-engaged position of said member in either over-center condition of the linkage and the clutch-disengaged position thereof in the dead-center condition of said linkage; a second clutch member connected to the second clutch and movable between clutch-engaged and clutch-disengaged positions; second means connecting said second member to the linkage for moving said second member by the linkage, said second means including a first lost-motion device enabling movement of the linkage back and forth between said first over-center condition and said dead-center condition while leaving the second member in its clutch-disengaged position, a first one-way force-transmitting connection effective to move said second member to its clutch-engaged position upon movement of the linkage past said over-center condition toward said second over-center condition, a second lost-motion device enabling back and forth movement of the linkage between said second over-center condition and said dead-center condition while leaving the second member in its clutch-engaged position, and a second one-way force-transmitting connection effective to move said second member to its clutch-disengaged position upon movement of the linkage past said dead-center condition toward said first over-center condition; and control means for moving said linkage.

2. Control mechanism for a power transmission including first and second selectively engageable and disengageable clutches, comprising: a support; over-center linkage means on the support and having first and second over-center condition respectively at opposite sides of a dead-center condition; a first clutch member connected to the first clutch and movable between clutch-engaged and clutch-disengaged positions; first means connecting said member to the linkage for incurring the clutch-engaged position of said member in either over-center condition of the linkage and the clutch-disengaged position thereof in the dead-center condition of said linkage; a second clutch member connected to the second clutch and movable between clutch-engaged and clutch-disengaged positions; second means connecting said second member to the linkage for coordinating movement of said second member with said linkage so that movement of said second member to said clutch-disengaged position is delayed until the linkage moves from said first over-center condition to said second over-center condition and reverse movement of said second member to its clutch-engaged position is delayed until said linkage is moved from said second over-center condition to said first over-center condition whereby said linkage may be moved back and forth at either side of said dead-center condition to engage and disengage the first clutch without changing the status of the second clutch; and control means for moving said linkage.

3. Control mechanism for a power transmission including first and second selectively engageable and disengageable clutches, comprising: a support; over-center linkage means including a clutch arm connected to the support between clutch-engaged and clutch-disengaged positions, a control arm rockable on the support, and a link having opposite ends provided respectively with pivotal connections to the arms and so arranged that the pivotal connection to the control arm is movable to first and second over-center condition respectively at opposite sides of a dead-center condition; a second clutch member connected to the second clutch and movable between clutch-engaged and clutch-disengaged positions; means connecting said second member to the linkage for coordinating movement of said second member with said linkage so that movement of said second member to its clutch-disengaged position is delayed until the linkage moves from said first over-center condition to said second over-center condition and reverse movement of said second member to its clutch-engaged position is delayed until said linkage is moved from said second over-center condition to said first over-center condition whereby said linkage may be moved back and forth at either side of said dead-center condition to engage and disengage the first clutch without changing the status of the second clutch.

4. Control mechanism for a power tranmission including first and second selectively engageable and disengageable clutches, comprising: a support; over-center linkage means including a clutch arm connected to the first clutch and rockable on the support between clutch-engaged and clutch-disengaged positions, a control arm rockable on the support, and a link having opposite ends provided respectively with pivotal connections to the arms and so arranged that the pivotal connection to the control arm is movable to first and second over-center condition respectively at opposite sides of a dead-center condition; a second clutch member connected to the second clutch and movable between clutch-engaged and clutch-disengaged positions; means connecting said second member to the linkage for coordinating movement of said second member with said linkage so that movement of said second member to its clutch-disengaged position is delayed until the linkage moves from said first over-center condition to said second over-center condition and reverse movement of said second member to its clutch-engaged position is delayed until said linkage is moved from said second over-center condition to said first over-center condition whereby said linkage may be moved back and forth at either side of said dead-center condition to engage and disengage the first clutch without changing the status of the second clutch.

5. Control mechanism for a power transmission including first and second selectively engageable and disengageable clutches, comprising: a support; over-center linkage means on the support and having first and second over-center condition respectively at opposite sides of a dead-center condition; a first clutch member connected to the first clutch and movable between clutch-engaged and clutch-disengaged positions; first means connecting said member to the linkage for incurring the clutch-engaged position of said member in either over-center condition of the linkage and the clutch-disengaged position thereof in the dead-center condition of said linkage; a second clutch member connected to the second clutch and including a bell crank rockable on the support between clutch-engaged and clutch-disengaged positions, said bell crank having a pair of angularly spaced arms; an actuator carried by the linkage and loosely receivable between said arms to have limited lost-motion in opposite directions before contacting either arm and so arranged that the linkage is movable back and forth between either over-center condition and said dead-center position without rocking said bell crank, said actuator contacting one arm to rock the bell crank in one direction when the linkage moves past said dead-center condition toward one over-center condition and contacting the other arm to rock the bell crank in the opposite direction when the linkage moves past said dead-center condition toward said other over-center condition.

6. Control mechanism, comprising: a support; a first element movable on the support between first and second positions; a second, separate element movable on the support between first and second positions; a control member movable forwardly on the support in first and second consecutive ranges and reversely back through said ranges; first means engageable between the first element and the control member for moving the first element from its first position to its second position as the control member moves forwardly in its first range and from its second position to its first position as the control member continues forwardly in its second range and for repeating said position changes as the control member moves reversely through said second and first ranges; and second means engageable between the control member and the second element for moving the second element from its first position to its second position only when the control member moves forwardly from its first range moving said second element from its second position to its first position only when the control member moves reversely from its second range into its first range.

References Cited in the file of this patent

UNITED STATES PATENTS

| | | |
|---|---|---|
| 1,470,321 | Cooper | Oct. 9, 1923 |
| 2,170,172 | Wemp | Aug. 22, 1939 |
| 2,853,892 | Sheppard | Sept. 30, 1958 |
| 2,880,833 | Stevenson et al. | Apr. 7, 1959 |